United States Patent
Sakata et al.

(10) Patent No.: US 8,614,888 B2
(45) Date of Patent: Dec. 24, 2013

(54) DISPLAY DEVICE

(75) Inventors: Tatsuya Sakata, Tokyo (JP); Ryuichi Sugimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 74 days.

(21) Appl. No.: 13/361,201

(22) Filed: Jan. 30, 2012

(65) Prior Publication Data

US 2012/0206866 A1 Aug. 16, 2012

(30) Foreign Application Priority Data

Feb. 16, 2011 (JP) ................. 2011-030690

(51) Int. Cl.
*G06F 1/16* (2006.01)

(52) U.S. Cl.
USPC ............ 361/679.59; 361/679.21; 361/679.22; 361/679.6; 312/223.1; 312/223.2; 248/917; 248/918

(58) Field of Classification Search
USPC ................................... 361/679.59
See application file for complete search history.

(56) References Cited

U.S. PATENT DOCUMENTS

| | | | |
|---|---|---|---|
| 7,715,180 B2* | 5/2010 | Titzler et al. | 361/679.23 |
| 8,081,261 B2* | 12/2011 | Honda et al. | 348/836 |
| 8,302,262 B2* | 11/2012 | Katsumata et al. | 16/354 |
| 2005/0270732 A1* | 12/2005 | Titzler et al. | 361/681 |
| 2007/0109734 A1* | 5/2007 | Chen et al. | 361/681 |
| 2009/0122219 A1 | 5/2009 | Miyayama | |

FOREIGN PATENT DOCUMENTS

JP 4314295 5/2009

* cited by examiner

*Primary Examiner* — Anthony Q Edwards
(74) *Attorney, Agent, or Firm* — Sony Corporation

(57) ABSTRACT

There is provided a display device which makes it possible to reduce a variation in a contact area between a base member and an installation surface, and enhance the stability. The display device includes a main body section and a stand supporting the main body section on an installation surface. The stand includes a base section including a plate-shaped base member which is in contact with the installation surface at a front side thereof and is inclined in a front-back direction with respect to the installation surface, and a connecting section connecting the base section and the main body section.

9 Claims, 16 Drawing Sheets

DISPLAY DEVICE

BACKGROUND

The present disclosure relates to a display device such as a television device.

A display device such as a television device includes a stand for supporting, on an installation surface, a main body section which displays an image. The stand has, for example, a configuration in which a supporting column is erected at a central portion of a base frame (base member), and a main body section is attached to an upper end of the supporting column (see, for example, Japanese patent No. 4314295).

SUMMARY

However, in the known configuration as described above, since the entire face of the base frame is in contact with the installation surface, an excessively large load is applied to a portion at which a supporting column of the base frame is erected in comparison to other portions, and consequently, there is a risk that a contact area between the base frame and the installation surface tends to be varied. This risk has become increasingly pronounced along with the increase in weight due to the increase in size of the main body section.

It is desirable to provide a display device which makes it possible to reduce a variation in a contact area between a base member and an installation surface, and enhance the stability.

A display device according to an embodiment of the present disclosure has a main body section and a stand supporting the main body section on an installation surface. The stand includes the following components (A) and (B):

(A) a base section including a plate-shaped base member which is in contact with the installation surface at a front side thereof and is inclined in a front-back direction with respect to the installation surface; and (B) a connecting section connecting the base section and the main body section.

In the display device according to an embodiment of the present disclosure, the base member is placed in contact with the installation surface at the front side thereof and inclined in a front-back direction with respect to the installation surface, and therefore, the contact portion between the base member and the installation surface is limited to the front side of the base member, regardless of the weight of the main body section. Consequently, it is possible to reduce a variation in a contact area between the base member and the installation surface, and improve the stability.

In the display device according to an embodiment of the present disclosure, the base member is placed in contact with the installation surface at the front side thereof and inclined in a front-back direction with respect to the installation surface, and consequently a variation in a contact area between the base member and the installation surface may be reduced to improve the stability.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Embodiments of the present disclosure will be specifically described below with reference to the drawings. The description will be made in the following order.
1. Embodiment (an example where a base member covers a part of the upper face of a supporting member)
2. Modification 1 (an example where the base member covers the entirety of the upper face of the supporting member)
3. Modification 2 (an example where a rotary mechanism is provided rearwardly of a main body section, and an intermediate portion of a connecting section is inclined in a front-back direction with respect to an installation surface)
4. Modification 3 (an example where the rotary mechanism is provided rearwardly of the main body section, and the intermediate portion of the connecting section is perpendicular to the installation surface)
5. Modification 4 (an example where a sensor section is provided at the front face of the supporting member)
6. Modification 5 (an example where a housing section for detachably housing therein an accessory apparatus for the main body section is provided at the side face of the supporting member)

7. Modification 6 (an example where the base member is provided with an indicator for indicating the operational state of the main body section)

Figure 1:
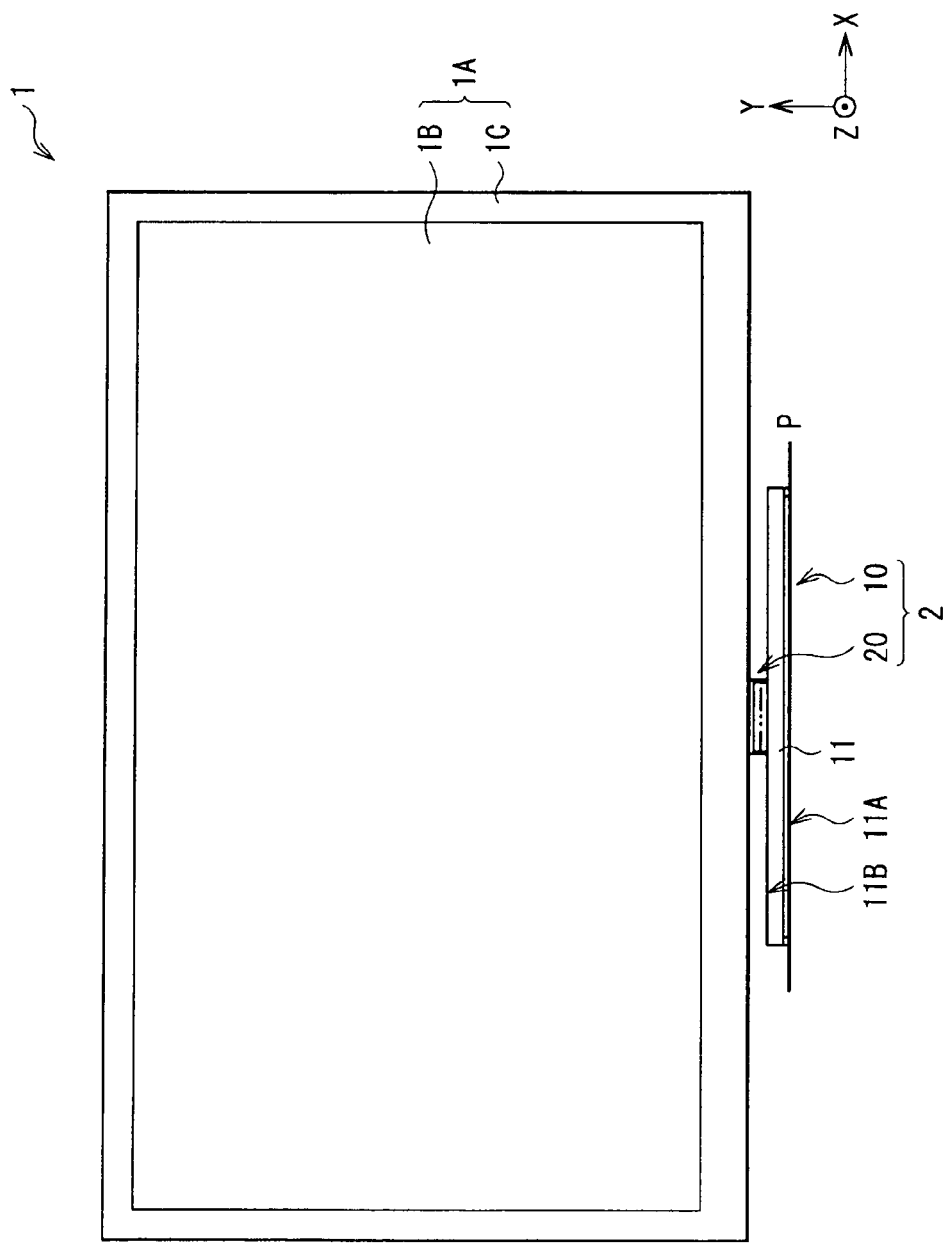
FIG. 1 is a front elevational view illustrating an external appearance of a display device according to an embodiment of the present disclosure as seen from a front side.
Figure 2:
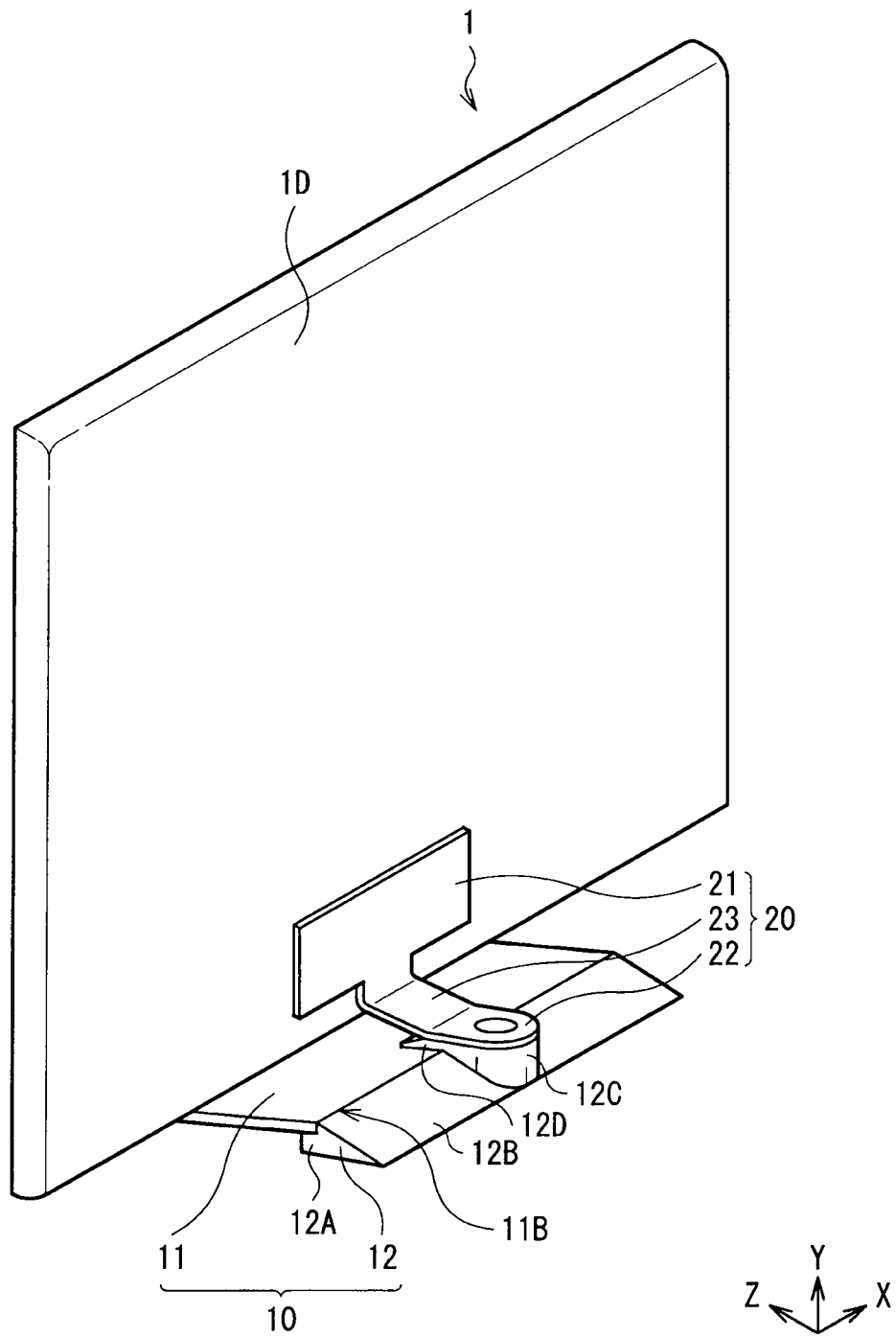
FIG. 2 is a perspective view illustrating an external appearance of the display device shown in FIG. 1 as seen from a back side.
Figure 3:
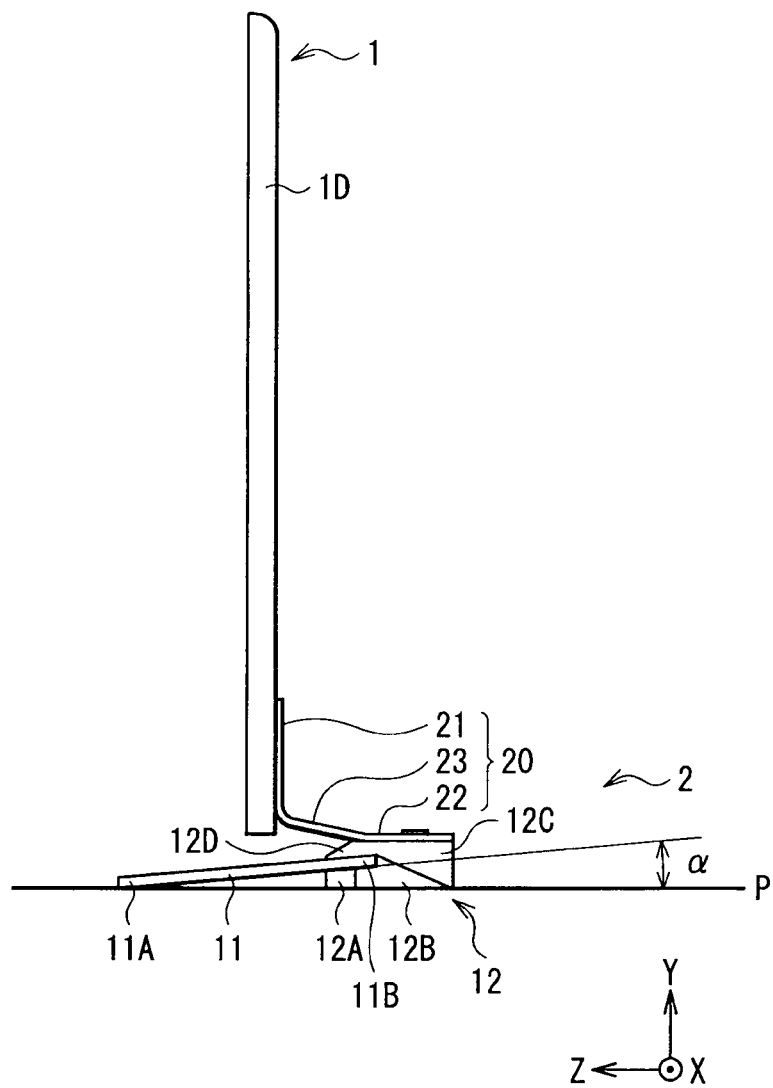
FIG. 3 is a side elevational view of the display device shown in FIG. 1.

FIG. 1, FIG. 2, and FIG. 3 illustrate external appearances of a display device according to an embodiment of the present disclosure as seen from a front side, a back side, and a lateral side, respectively. The display device is used as, for example, a television device, and has a configuration in which a main body section 1 for displaying an image is supported by a stand 2 on a horizontal installation surface P. In the following description, the horizontal direction of the main body section 1 is represented by X direction, the vertical direction of the main body section 1 is represented by Y direction, and the thickness direction (front-back direction) of the main body section 1 is represented by Z direction.

The main body section 1 has, for example, a display panel 1A configured of a liquid crystal display panel. A display screen 1B is provided at a central portion of the front face of the display panel 1A. An outer peripheral portion of the display screen 1B is a frame portion 1C with a frame shape. The back face of the display panel 1A is covered by a back face cover 1D.

The stand 2 includes a base section 10 provided on the installation surface P, and a connecting section 20 for connecting the base section 10 and the main body section 1.

The base section 10 has a plate-shaped base member 11 The base member 11 is in contact with the installation surface P at a front side 11A, and inclined in a front-back direction with respect to the installation surface P. Specifically, the base member 11 contacts with the installation surface P only at the front side 11A, and a rear side 11B is supported by a supporting member 12. Portions other than the front side 11A and the rear side 11B of the base member 11 are separated from the installation surface P (or out of contact with the installation surface P). Thus, this display device makes it possible to reduce variation in a contact area between the base member 11 and the installation surface P, and enhance the stability.

The base member 11 is preferably configured of, for example, a transparent board such as a glass plate and a resin plate made of acrylic resin or the like. With this configuration, the back side of the base member 11 may be seen through, and the fact that the base member 11 is separated from the installation surface P may be visually recognized with clarity, and consequently, a feeling of floating and airiness may be produced. Thus, the transparency of the glass plate or the resin plate may be utilized to the full extent so as to increase the advantage of the inclination of the base member 11, in terms of appearance and design.

Preferably, the base member 11 has a thickness of, for example, about 10 mm, and is configured of so called laminated glass in which two glass plates are laminated with each other. This makes it possible that, even if one of the glass plates is broken, the other glass plate supports the broken glass plate (a measure for explosion-proofing), and thus the safety may be significantly enhanced. In addition, while in the known art a metal plate is laid on the lower face of a glass plate as a measure for explosion-proofing, the metal plate is not necessary in the present embodiment, and the transparent glass plate itself may be used as the base member 11.

Preferably, an inclination angle α of the base member 11 with respect to the installation surface P is, for example, about 7°, although depending on the weight of the main body section 1. With this, it becomes possible to make the connecting section 20 less-visible from the front (display screen 1B side) of the main body section 1.

The supporting member 12 supports a position other than the front side 11A of the base member 11, such as the rear side 11B, and is configured of a metal such as aluminum (Al). Also, the supporting member 12 may be configured by combining a metal part and a resin part.

Specifically, the supporting member 12 has a front portion 12A for holding the rear side 11B of the base member 11, and a rear portion 12B which is not covered by the base member 11. At the central portion of the rear portion 12B, a rotary mechanism housing section 12C with a cylindrical shape is provided as a through-hole for housing a rotary mechanism 30 described later. Portions other than the rotary mechanism housing section 12C of the rear portion 12B are configured as an inclined surface, for example. However, the shape of the rear portion 12C is not specifically restricted to the inclined surface.

A reinforcing member 12D made of for example, aluminum (Al) is provided between the front portion 12A of the supporting member 12 and a second attachment portion 22 of the connecting section 20. The reinforcing member 12D and the front portion 12A sandwich the rear side 11B of the base member 11 to prevent a load due to the weight of the main body section 1 from being applied to the rear side 11B of the base member 11. The front portion 12A of the supporting member 12 and the reinforcing member 12D are fixed with each other with a screw (not shown) provided in a screw hole 12E (not shown in FIG. 1 to FIG. 3; see FIG. 4).

The connecting section 20 is a plate-shaped member which has an intermediate portion 23 provided between a first attachment portion 21 located on the main body section 1 side and the second attachment portion 22 located on the base section 10 side. The first attachment portion 21 is fixed to the back face of the main body section 1 with a screw or the like, and has a width greater than that of the intermediate portion 23 in order to realize a secure fixation. The second attachment portion 22 is fixed, with a screw or the like, to the rotary mechanism 30 (not shown in FIG. 1 to FIG. 3; see FIG. 4) housed in the rotary mechanism housing section 12C.

Preferably, the intermediate portion 23 is inclined in a front-back direction with respect to the installation surface P. With this configuration, the strength of the main body section 1 in a horizontal direction may be increased.

Figure 4:
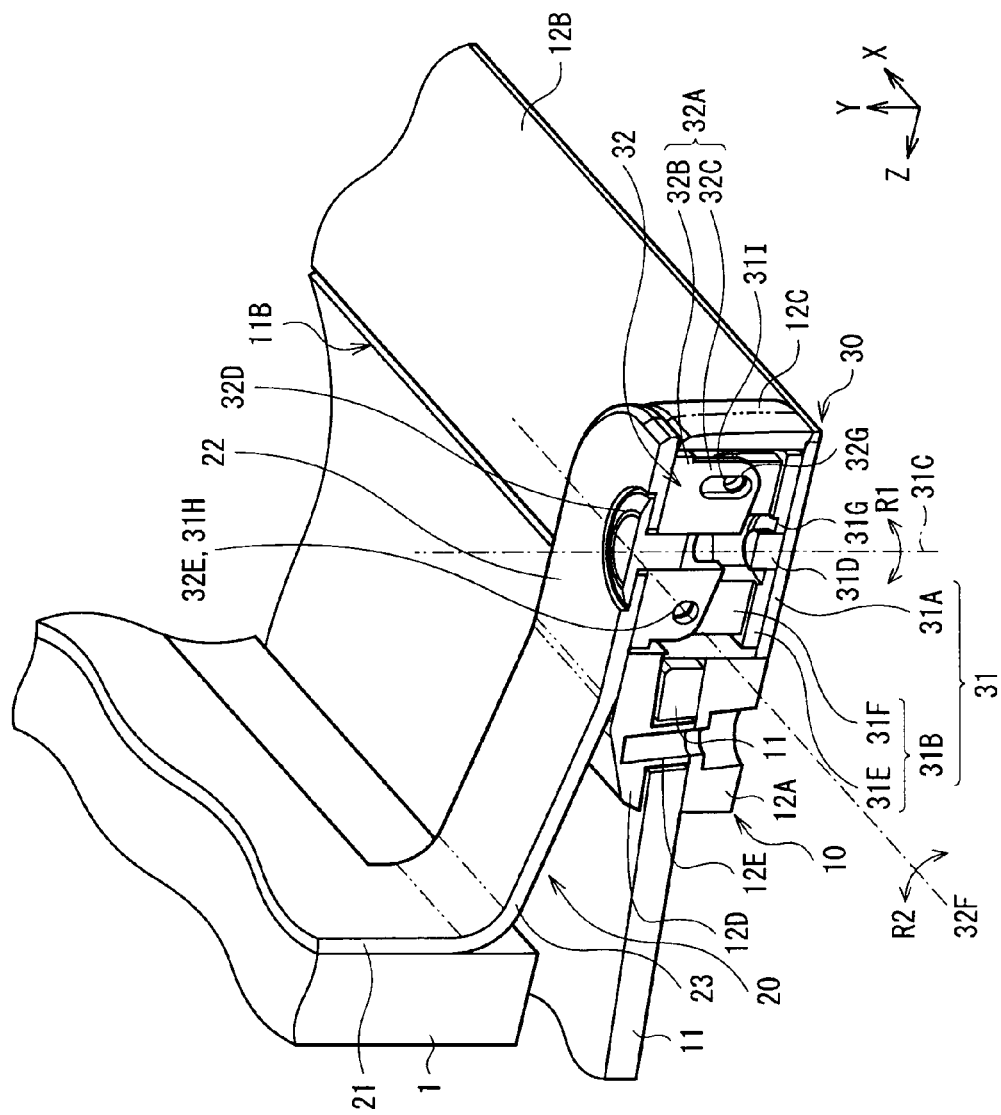
FIG. 4 is a perspective view illustrating the display device shown in FIG. 3 along a vertical centerline of a connecting section.

FIG. 4 illustrates a configuration of the supporting member 12 and the rotary mechanism 3 by cutting the display device illustrated in FIG. 3 along a vertical centerline of the connecting section 20.

The rotary mechanism 30 is embedded in the rotary mechanism housing section 12C, as described above. The rotary mechanism 30 has a swivel mechanism 31 for rotating the main body section 1 in a horizontal direction, and a tilt mechanism 32 for rotating the main body section 1 in an up and down direction. The rotary mechanism 30 is disposed rearwardly of the base member 11, so that there is no necessity to incorporate the rotary mechanism 30 in the connecting section 20. Therefore, it becomes possible to allow the connecting section 20 to have a slim shape in side view as a plate shaped member, and at the same time, it becomes possible to cause the rotary mechanism 30 to carry out a tilt movement and a swivel movement of the main body section 1. Consequently, both design property and functionality may be achieved.

The swivel mechanism 31 includes, in order from the installation surface P side, a swivel fixing member 31A and a swivel movable member 31B. On the other hand, the tilt mechanism 32 has a tilt member 32A.

The swivel fixing member 31A has at a central portion thereof a protrusion 31D which serves as a swivel rotary axis 31C, and is, at a position not shown in FIG. 4, fixed to the supporting member 12 with a screw or the like. It is to be noted that, although FIG. 4 illustrates the case that the rotary mechanism housing section 12C is a through-hole and the lower face of the swivel fixing member 31A is placed in contact with the installation surface P, the rotary mechanism housing section 12C may be a recess instead of the through-hole. In this case, the lower face of the swivel fixing member 31A contacts with the bottom face of the recess of the rotary mechanism housing section 12C.

The swivel movable member 31B is a member with an L-shape in cross section, and has a lateral portion 31E on the swivel fixing member 31A and a longitudinal portion 31F erected on the lateral portion 31E. A step 31G is provided at a central portion of the lateral portion 31E. The step 31G is a portion into which a nut (not shown) for caulking the swivel fixing member 31A and the swivel movable member 31B is fitted. The longitudinal portion 31F is provided on the opposite sides of the swivel rotary axis 31C. The longitudinal portions 31F respectively have circular screw holes 31H and 31I used for connection with the tilt member 32A.

Figure 5:
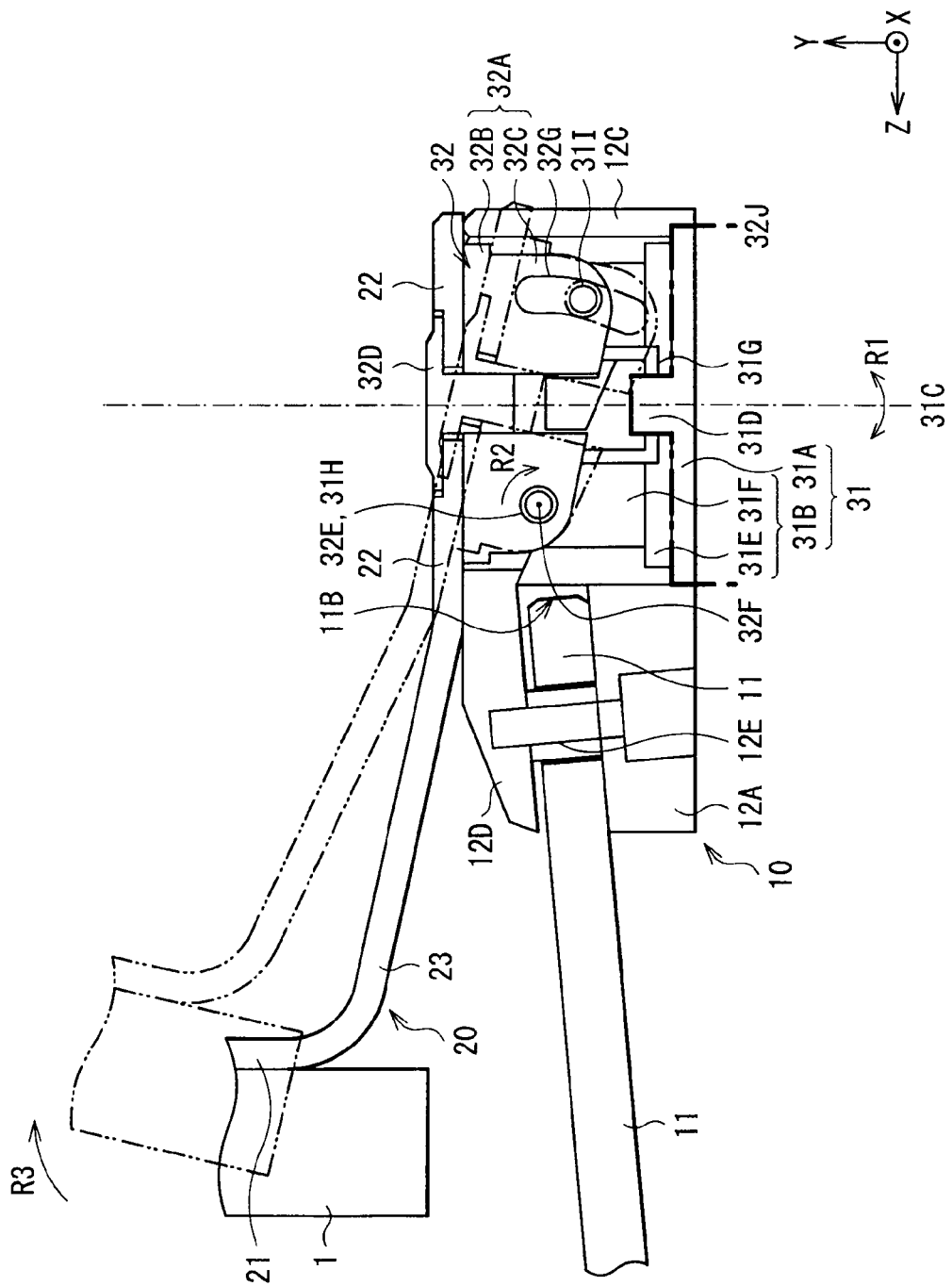
FIG. 5 is a sectional view for illustrating a tilt movement and a swivel movement of the rotary mechanism shown in FIG. 4.

As shown in FIG. 5 for example, the swivel movable member 31B described above rotates around the swivel rotary axis 31C in an arrow R1 direction while sliding on a swivel rotary surface 31J which is a boundary surface between the swivel fixing member 31A and the swivel movable member 31B. In accordance with this, the tilt member 32A, the connecting section 20, and the main body section 1 carry out a swivel movement in the arrow R1 direction. Incidentally, it is desirable that the swivel fixing member 31A and the swivel movable member 31B be provided with a structure (not shown) for regulating the swivel angular range of the main body section 1, although not shown in the figure.

On the other hand, the tilt member 32A shown in FIG. 4 is a member with an L-shape in cross section, and has a lateral portion 32B placed under the second attachment portion 22 of the connecting section 20 and a longitudinal portion 32C bent downwardly from the lateral portion 32B. The lateral portion 32B is fixed to the second attachment portion 22 of the connecting section 20 with a screw 32D. The longitudinal portion 32C is provided on the opposite sides of the swivel rotary axis 31C. The longitudinal portion 32C which is placed on the main body section 1 side (that is, the left side in FIG. 4) has a circular screw hole 32E. Through the screw hole 32E and the screw hole 31H of the longitudinal portion 31F placed on the left side of the swivel movable member 31B, a screw (not shown) which serves as a tilt rotary axis 32F is inserted for spiral movement. The longitudinal portion 32C which is placed on the side opposite to the main body section 1 (that is, the right side in FIG. 4) has an elongate hole 32G with a circular arc shape. Through the elongate hole 32G and the screw hole 31I of the longitudinal portion 31F placed on the right side of the swivel movable member 31B, a screw (not shown) on a tilt movable side is inserted.

As indicated by the imaginary line in FIG. 5 for example, a screw (not shown), which is inserted through the screw hole 31I of the longitudinal portion 31F placed on the right side of the swivel movable member 31B, moves in the elongate hole 32G, and thus the tilt member 32A rotates around the tilt rotary axis 32F in an arrow R2 direction. In accordance with this, also as indicated by the imaginary line in FIG. 5, the connecting section 20 and the main body section 1 carry out a tilt movement in an arrow R3 direction. The length of the elongate hole 32G is set such that, for example; the tilt angular range of the main body section 1 is 0° (vertical) to 6° (rearward).

In the display device, a desired image is displayed on the display screen 1B by the display panel 1A of the main body section 1. In this configuration, the base member 11 is placed in contact with the installation surface P at the front side 11A thereof and inclined in a front-back direction with respect to the installation surface P, and therefore, the contact portion between the base member 11 and the installation surface P is limited to the front side 11A of the base member 11, regardless of the weight of the main body section 1. Consequently, it is possible to reduce variation in a contact area between the base member 11 and the installation surface P, and improve the stability.

In the present embodiment as described above, since the base member 11 is placed in contact with the installation surface P at the front side 11A thereof and inclined in a front-back direction with respect to the installation surface P, it is possible to reduce variation in a contact area between the base member 11 and the installation surface P, and enhance the stability.

In addition, since the intermediate portion 22 of the connecting section 20 is inclined in a front-back direction with respect to the installation surface P, the strength of the main body section 1 in a horizontal direction may be increased.

Further, since the rotary mechanism 30 is housed in the rotary mechanism housing section 12C of the supporting member 12 and the second attachment portion 22 of the connecting section 20 is attached to the rotary mechanism 30, the rotary mechanism 30 may be disposed rearwardly of the base member 11 and it is not necessary to incorporate the rotary mechanism 30 in the connecting section 20. Therefore, it is possible to allow the connecting section 20 to have a slim shape in side view as a plate shaped member, and at the same time, it is possible to cause the rotary mechanism 30 to carry out a tilt movement and a swivel movement of the main body section 1. Consequently, both design property and functionality may be achieved.

Modification 1

Figure 6:
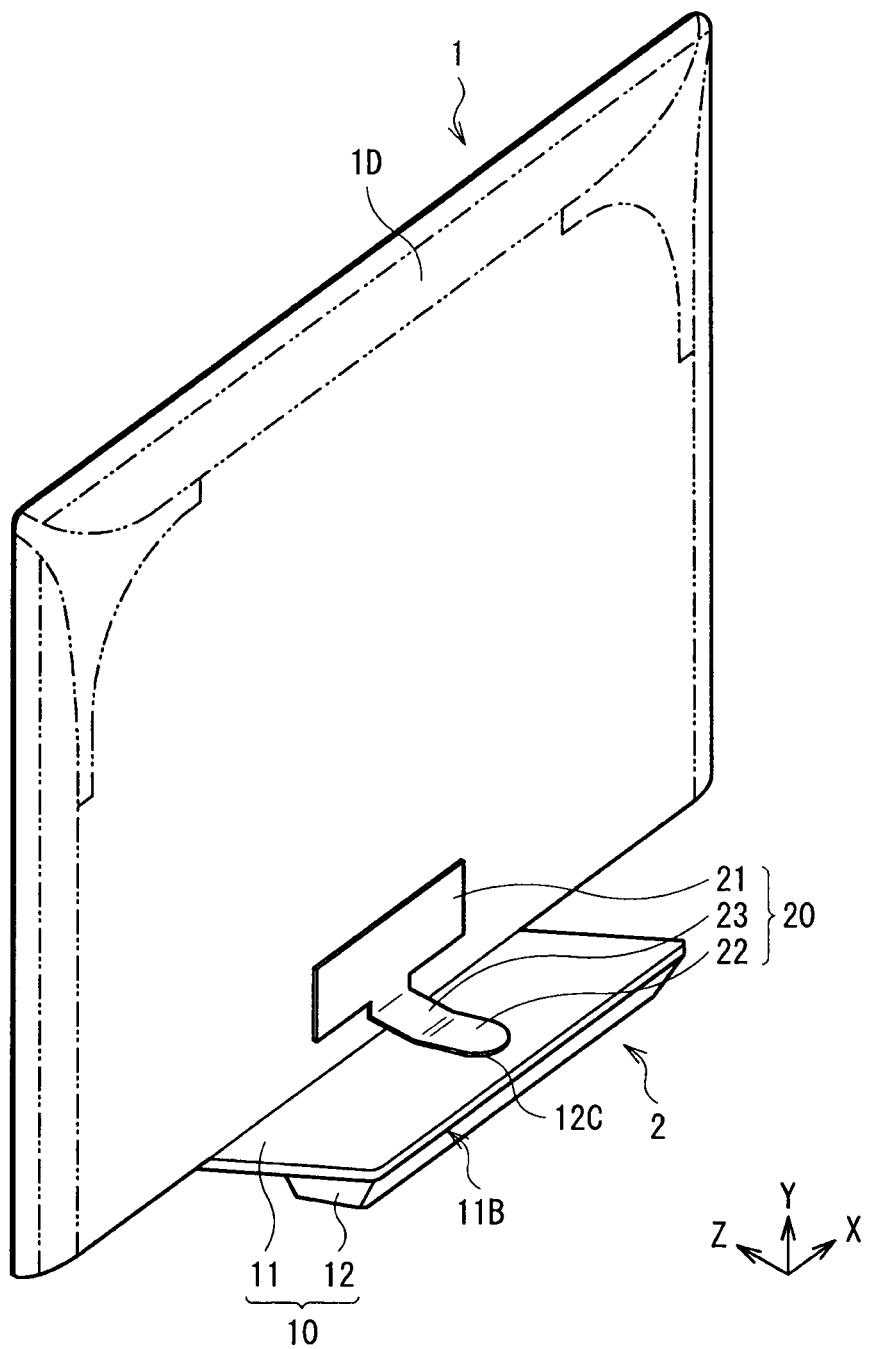
FIG. 6 is a perspective view illustrating an external appearance of a display device according to modification 1 as seen from a back side.
Figure 7:
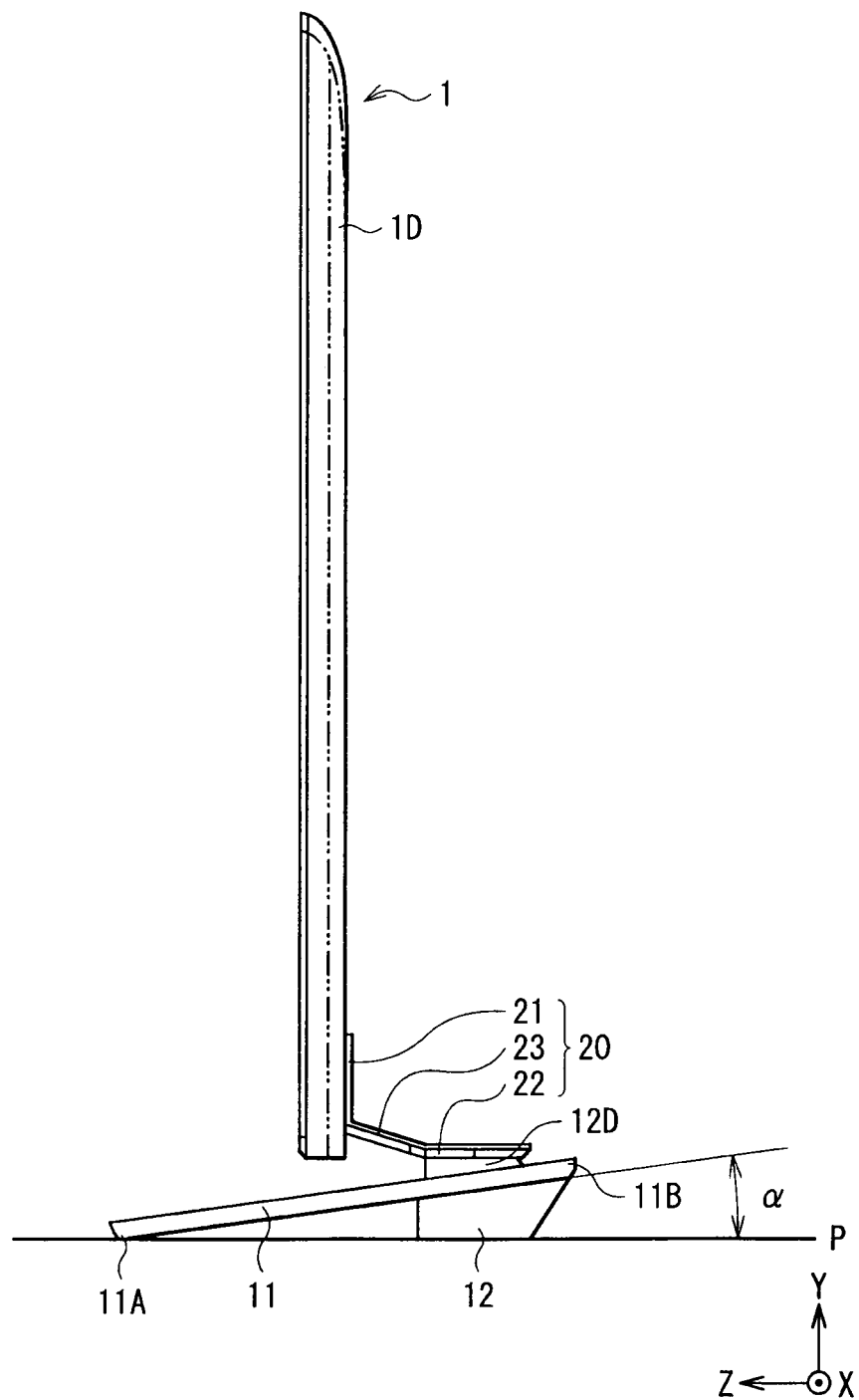
FIG. 7 is a side elevational view of the display device shown in FIG. 6.
Figure 8:
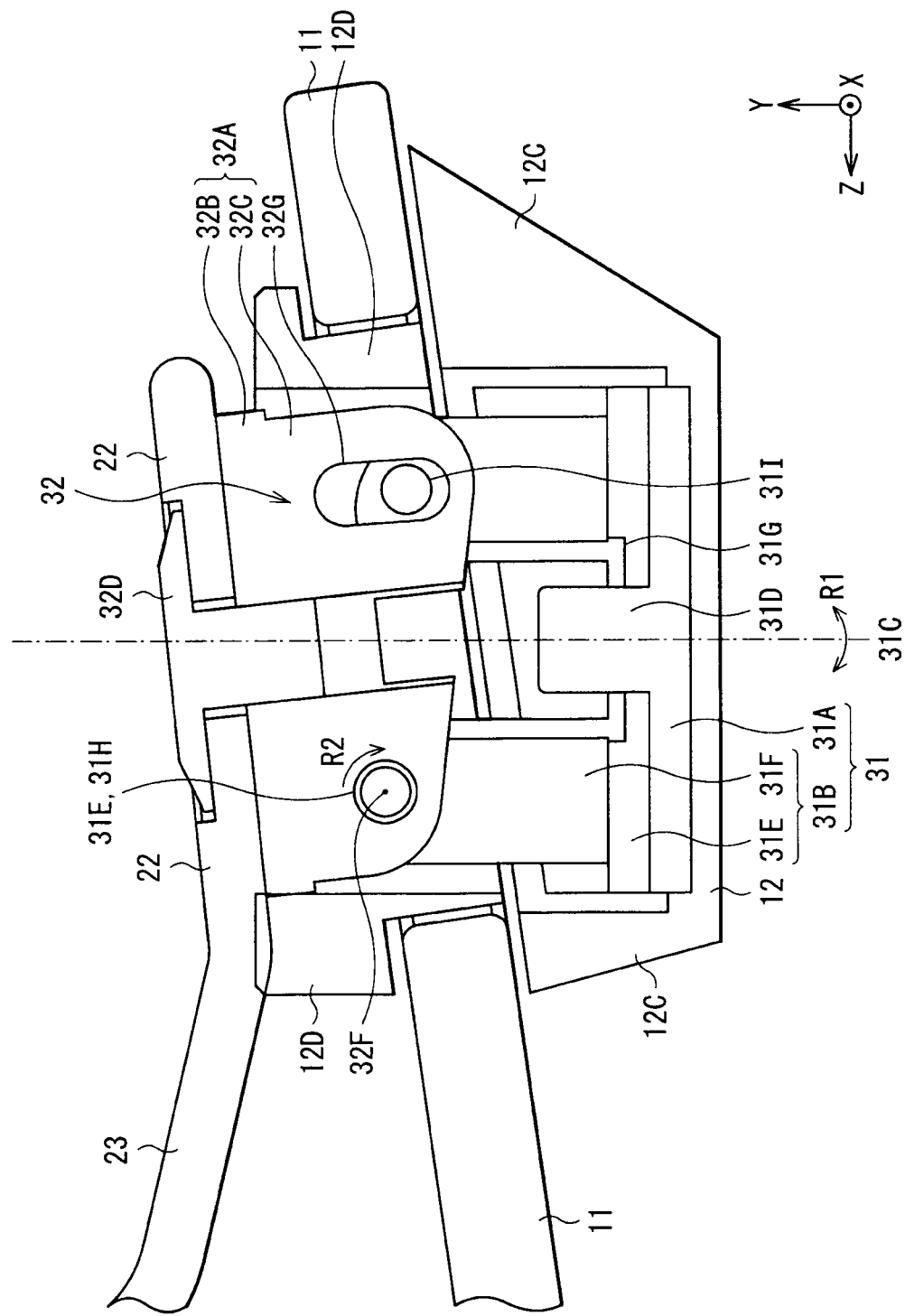
FIG. 8 is a sectional view along a vertical centerline of a connecting section of FIG. 7.

FIG. 6 and FIG. 7 illustrate external appearances of a display device according to modification 1 as seen from a back side and a lateral side, respectively. FIG. 8 illustrates a configuration of a supporting member 12 and a rotary mechanism 30 by cutting the display device illustrated in FIG. 7 along a vertical centerline of a connecting section 20. Except that a base member 11 entirely covers the upper face of the supporting member 12, the display device of the present modification has a similar configuration, function, and effect as those of the above mentioned embodiment.

Modification 2

Figure 9:
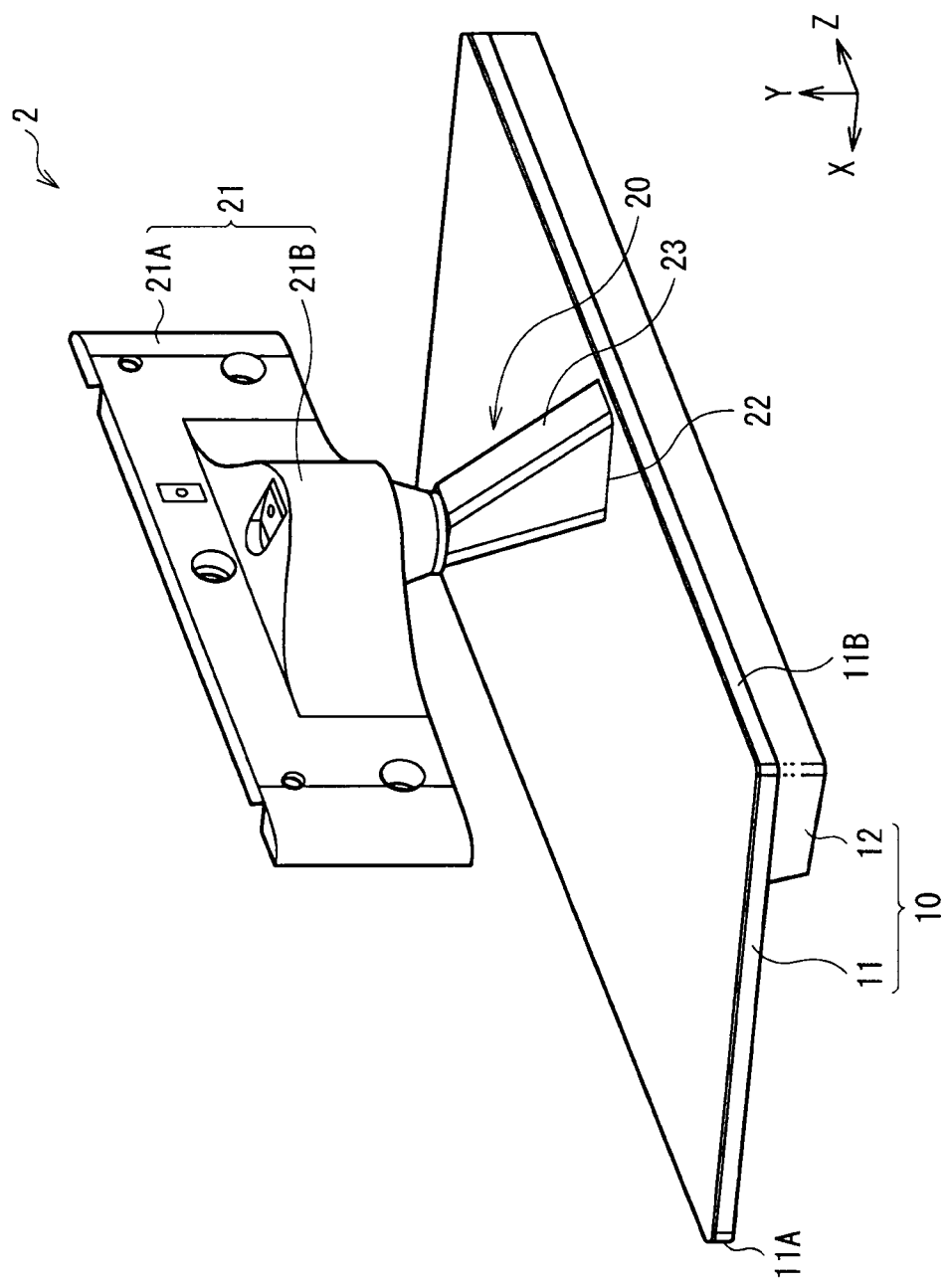
FIG. 9 is a perspective view illustrating an external appearance of a stand of a display device according to modification 2 as seen from a back side.
Figure 10:
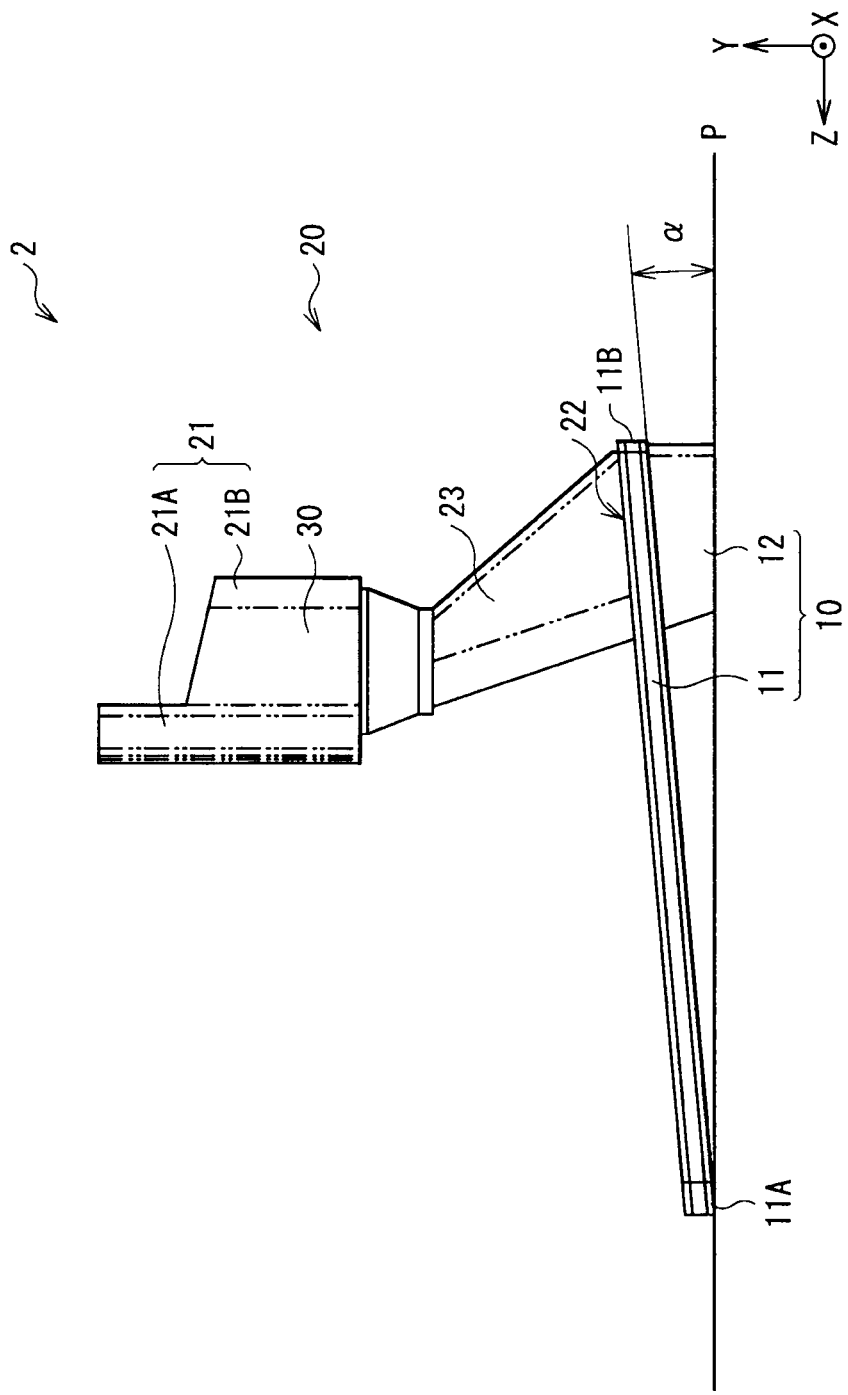
FIG. 10 is a side elevational view of the stand of the display device shown in FIG. 9.

FIG. 9 and FIG. 10 illustrate external appearances of a stand 2 of a display device according to modification 2 as seen from a back side and a lateral side, respectively. Except that a rotary mechanism 30 is provided in a first attachment portion 21 of a connecting section 20, the display device of the present modification has a similar configuration, function, and effect as those of the above mentioned modification 1.

The first attachment portion 21 has a fixing face 21A fixed to the back face of a main body section 1, and a rotary mechanism housing section 21B for housing the rotary mechanism 30. An intermediate portion 23 has a rectangular prism shape, for example. The rotary mechanism 30 is mounted on the upper end of the intermediate portion 23. The lower end of the intermediate portion 23 is a second attachment portion 22 fixed to the base section 10.

Preferably, the intermediate portion 23 is inclined in a front-back direction with respect to the installation surface P. This makes it possible to control the balance in the front-back direction by disposing the main body section 1 at the central portion of the base member 11.

It is to be noted that, the present modification may be applied to the case where the base member 11 covers a part of the upper face of the supporting member 12 as in the above mentioned embodiment.

Modification 3

Figure 11:
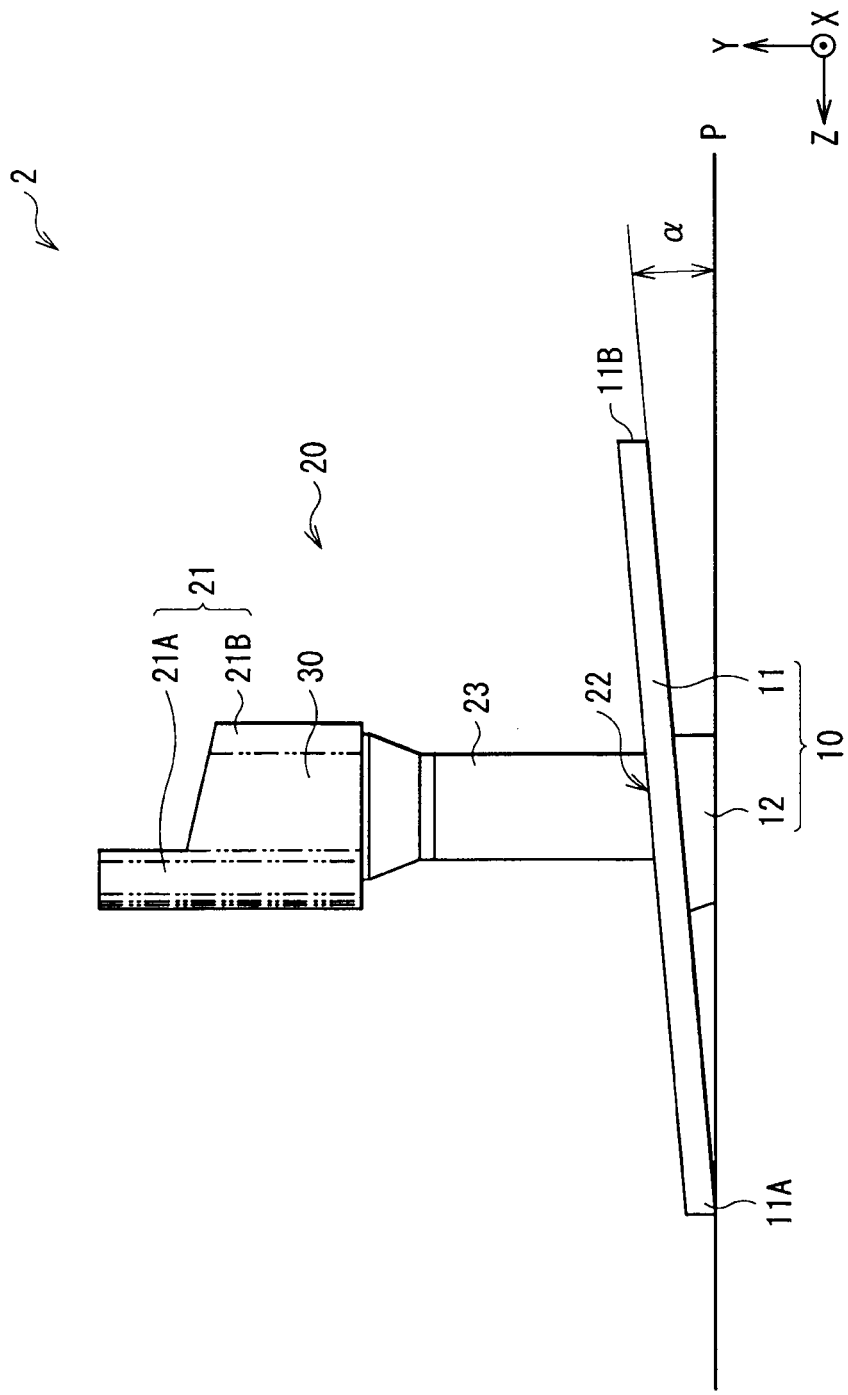
FIG. 11 is a side elevational view illustrating an external appearance of a stand of a display device according to modification 3.

FIG. 11 illustrates an external appearance of a stand 2 of a display device according to modification 3 as seen from a lateral side. Except that an intermediate portion 23 is perpendicular to an installation surface P, the display device of the present modification has a similar configuration, function, and effect as those of the above mentioned modification 2.

In the present modification, the intermediate portion 23 is preferably provided perpendicularly to the installation surface P at a central portion of a base member 11. This makes it possible to control the balance in the front-back direction by disposing a main body section 1 at a central portion of the base member 11.

Figure 12:
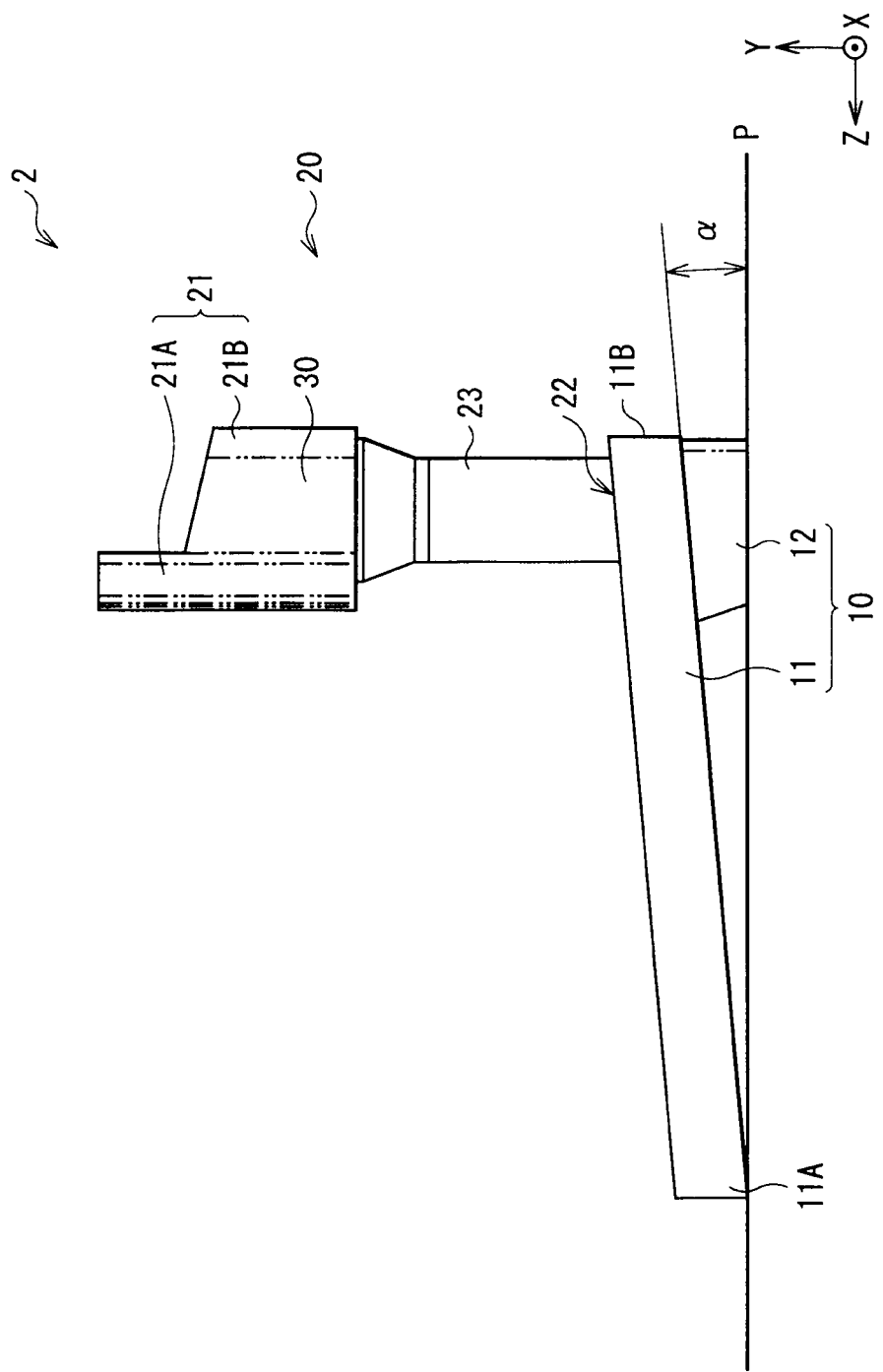
FIG. 12 is a side elevational view illustrating a modification of the stand shown in FIG. 11.

Alternatively, as shown in FIG. 12 for example, it is also possible to provide, in the proximity of a rear side 11B of the base member 11, the intermediate portion 23 which is perpendicular to the installation surface P. In this case, by increasing the thickness of the base member 11 to shift the center of gravity to the lower side, it is possible to control the balance in the front-back direction by disposing the main body section 1 at the rear of the base member 11.

It is to be noted that, the intermediate portion 23 may have a rectangular prism shape as is the case of the modification 2, or other shapes such as a cylindrical shape.

The present modification may be applied to the case where the base member 11 covers a part of the upper face of the supporting member 12 as in the above mentioned embodiment.

Modification 4

Figure 13:
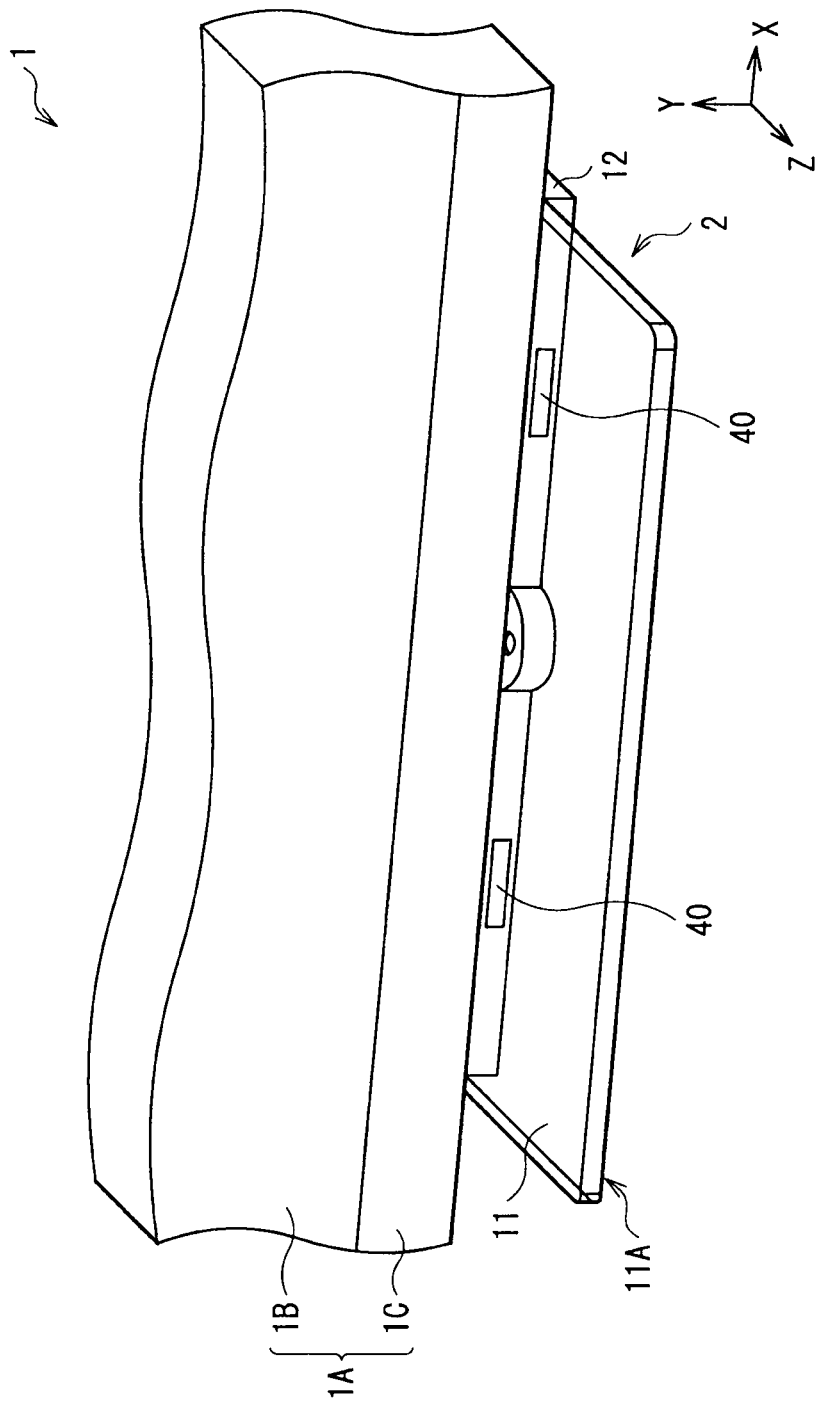
FIG. 13 is a perspective view illustrating a configuration of a part of a display device according to modification 4 as seen from a front side.

FIG. 13 illustrates a configuration of a part of a display device according to modification 4 as seen from a front side. Except that sensor sections 40 are provided on the front face of a supporting member 12, the display device of the present modification has a similar configuration, function, and effect as those of the above mentioned modification 1.

The sensor sections 40 transmit or receive a signal through a base member 11 configured of a transparent board. Specifically, each of the sensor sections 40 is made up of a transmitting and receiving section for wireless LAN, or an IR (infrared light) emitter for 3D. By providing the sensor sections 40 on the outside of a main body section 1, it becomes possible to promote the improvement in characteristic of the sensor section 40, and facilitate the reduction in size of the main body section 1 itself and size of a frame portion of the main body section 1. In addition, the advantage of configuring the base member 11 by the transparent board may further be utilized.

The present modification may be applied to the case where the base member 11 covers a part of the upper face of the supporting member 12 as in the above mentioned embodiment. In addition, the present modification may be applied to the case where a rotary mechanism 30 is provided in a first attachment portion 21 of a connecting section 20 as in the above mentioned modifications 2 and 3.

Modification 5

Figure 14:
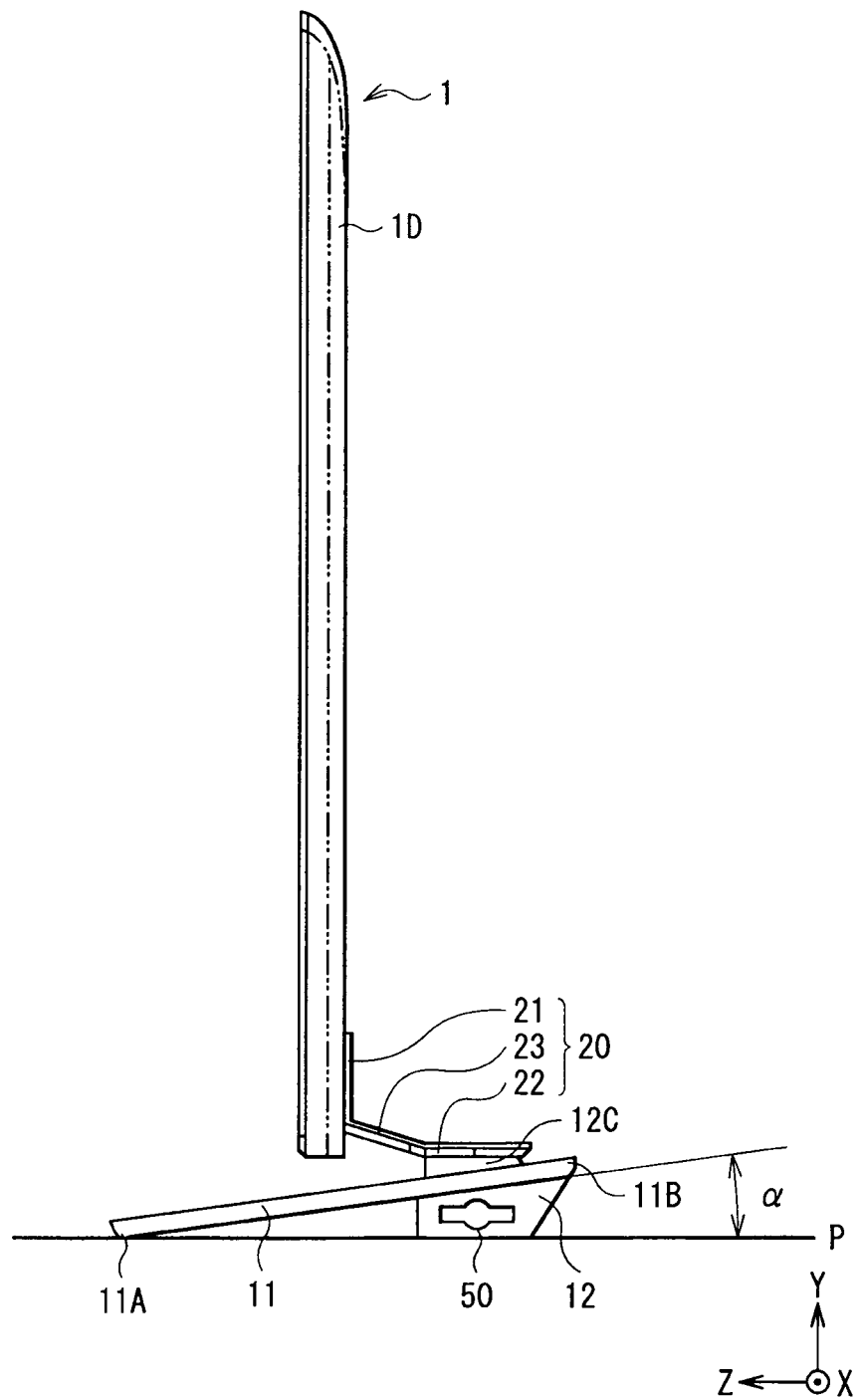
FIG. 14 is a side evaluation view illustrating a configuration of a part of a display device according to modification 5 as seen from a lateral side.

FIG. 14 illustrates a configuration of a part of a display device according to modification 5 as seen from a lateral side.

In the present modification, there is provided, at the right side face of a supporting member 12, an accessory apparatus housing section 50 for detachably housing therein an accessory apparatus for a main body section 1, in order to effectively use a space in the rear of a base member 11. Specifically, the accessory apparatus for the main body section 1 includes a remote controller (apparatus for remote-control operation) and an AC adapter. Except for this, the display device of the present modification has a similar configuration, function, and effect as those of the above mentioned modification 1.

Needless to say, while FIG. 14 illustrates the case where the accessory apparatus housing section 50 is provided at the right side face of the supporting member 12, the accessory apparatus housing section 50 may be provided at the left side face of the supporting member 12.

The present modification may be applied to the case where the base member 11 covers a part of the upper face of the supporting member 12 as in the above mentioned embodiment. Further, the present modification may be applied to the case where a rotary mechanism 30 is provided in a first attachment portion 21 of a connecting section 20 as in the above mentioned modifications 2 and 3. Alternatively, the present modification may be applied to the case where a sensor section 40 is provided at the front side face of the supporting member 12 as in the above mentioned modification 4.

Modification 6

Figure 15:
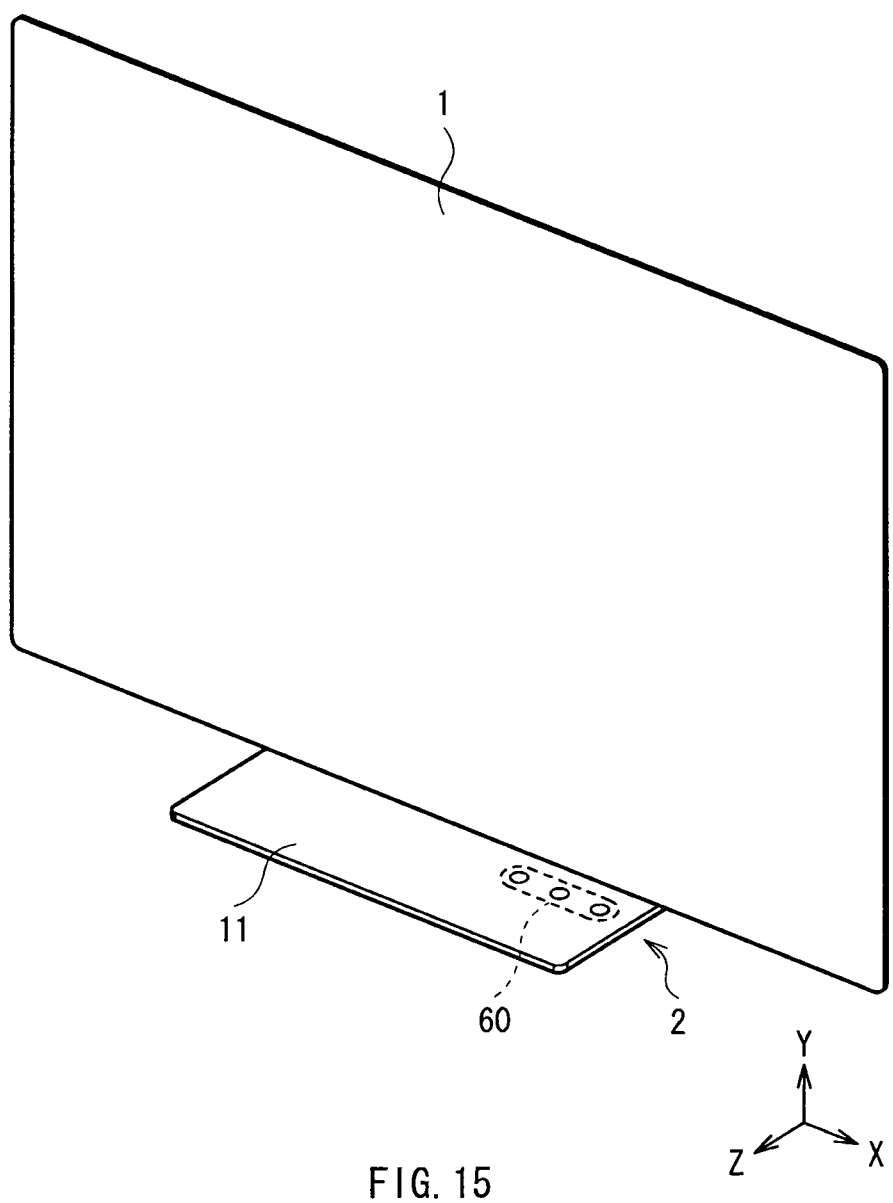
FIG. 15 is a perspective view illustrating a configuration of a part of a display device according to modification 6 as seen from a front side.

FIG. 15 illustrates an external appearance of a part of a display device according to modification 6 as seen from a front side. Except that a base member 11 is provided with an indicator 60, a display device of the present modification has a similar configuration, function, and effect as those of the above mentioned modification 1.

Figure 16:
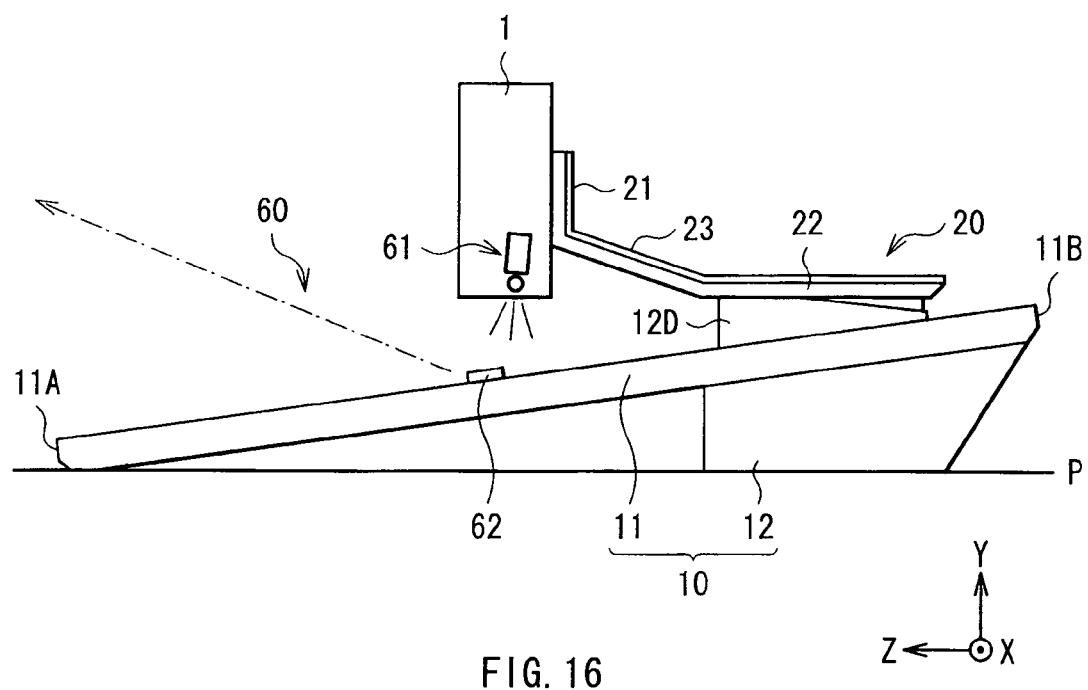
FIG. 16 is a view for illustrating a configuration of an indicator shown in FIG. 15.

The indicator 60 indicates an operational state such as power-on/stand-by of a main body section 1, and has an LED light emission section 61 provided at a lower portion of the lateral face of the main body section 1 and a reflection section 62 provided on the upper face of the base member 11, as shown in FIG. 16. In this case, since the base member 11 is inclined in a front-back direction, the reflection section 62 may be easily visually recognized. In the past, the indicator as described is typically provided on a frame portion (or the frame portion 1C shown in FIG. 1) of the main body section 1. However, since the frame portion has become increasingly narrower in recent years, it is almost impossible to install the indicator on the main body section 1. Even in this case, with the present modification, the indicator 60 may be installed by utilizing the inclination of the base member 11, so that the convenience of the viewer may be enhanced.

It is to be noted that, while the case has been described where the base member 11 is provided with the indicator 60 in the present modification, the base member 11 may be provided with an input section such as a keyboard in addition to or in place of the indicator 60. Also in this case, since the base member 11 is inclined in a front-back direction, this configuration has an ergonomic advantage that an input operation may be comfortably carried out.

The present modification may be applied to the case where the base member 11 covers a part of the upper face of the supporting member 12 as in the above mentioned embodiment. In addition, the present modification may be applied to the case where a rotary mechanism 30 is provided in a first attachment portion 21 of a connecting section 20 as in the above mentioned modifications 2 and 3, the case where a sensor section 40 is provided at the front side face of the supporting member 12 as in the above mentioned modification 4, or the case where an accessory apparatus housing section 50 is provided at the left or right face of the supporting member 12 as in the above mentioned modification 5.

While the present disclosure has been described above based on the embodiments, the present disclosure is not limited to the above mentioned embodiments, and various modifications may be made. For example, while in the above mentioned embodiments an exemplary case has been described where the display panel 1A is a liquid crystal display panel, a display panel which uses, in addition to the liquid crystal, plasma, organic EL (electroluminescence), inorganic EL, electrodeposition or electrochromic may be adopted as the display panel 1A.

In addition, for example, while an exemplary case has been described where the display device is a flat-screen television device in the above mentioned embodiment, the present disclosure is not limited to the television device and may be applied to other electronic devices such as a monitor for a personal computer or the like, a display device for a navigation system or the like, and a digital photo frame. Also, the present disclosure may be broadly applied to structures having a plate-shaped supported object such as a painting and a sign, and a stand.

The present technology may be configured as follows.

(1)
A display device having:
a main body section; and
a stand supporting the main body section on an installation surface, wherein the stand includes
  a base section including a plate-shaped base member which is in contact with the installation surface at a front side thereof and is inclined in a front-back direction with respect to the installation surface, and
  a connecting section connecting the base section and the main body section.

(2)
The display device according to (1), wherein
the connecting section has an intermediate portion between a first attachment portion on the main body section side and a second attachment portion on the base section side, and
the intermediate portion is inclined in a front-back direction with respect to the installation surface.

(3)
The display device according to (1), wherein
the connecting section has an intermediate portion between a first attachment portion on the main body section side and a second attachment portion on the base section side, and
the intermediate portion is perpendicular to the installation surface.

(4)
The display device according to any one of (1) to (3), wherein the connecting section is configured of a plate-shaped member.

(5)
The display device according to any one of (2) to (4), wherein the stand includes, in the first attachment portion or the second attachment portion of the connecting section thereof, a rotary mechanism rotating the main body section in an up and down direction and a horizontal direction.

(6)
The display device according to any one of (1) to (5), wherein the base section includes a supporting member supporting a position other than the front side of the base member.

(7)
The display device according to (6), wherein
the supporting member has a rotary mechanism housing section housing the rotary mechanism, and
the second attachment portion of the connecting section is attached to the rotary mechanism housed in the rotary mechanism housing section.

(8)
The display device according to (6) or (7), wherein the supporting member has, at the left or the right side face thereof, an accessory apparatus housing section detachably housing an accessory apparatus for the main body section.

(9)
The display device according to any one of (6) to (8) wherein
the base member is configured of a transparent board, and
the supporting member has at a front side face thereof a sensor section transmitting or receiving a signal through the base member.

(10)
The display device according to any one of (1) to (9), wherein the base member is provided with an indicator indicating an operational state of the main body section.

(11)
The display device according to any one of (1) to (10), wherein the base member is configured of a glass plate.

The present disclosure contains subject matter related to that disclosed in Japanese Priority Patent Application JP 2011-030690 filed in the Japan Patent Office on Feb. 16, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A display device comprising:
a main body section; and
a stand supporting the main body section on an installation surface, wherein the stand includes
  a base section including a plate-shaped base member which is in contact with the installation surface at a front side thereof and is inclined in a front-back direction with respect to the installation surface, and
  a connecting section connecting the base section and the main body section, the base section includes a supporting member supporting a position other than the front side of the base member, wherein the supporting member includes, at a left or a right side face thereof, an accessory apparatus housing section detachably housing an accessory apparatus for the main body section.

2. The display device according to claim 1, wherein
the connecting section includes an intermediate portion between a first attachment portion on the main body section and a second attachment portion on the base section, and
the intermediate portion is inclined in a front-back direction with respect to the installation surface.

3. The display device according to claim 1, wherein
the connecting section includes an intermediate portion between a first attachment portion on the main body section and a second attachment portion on the base section, and
the intermediate portion is perpendicular to the installation surface.

4. The display device according to claim 1, wherein the connecting section is configured of a plate-shaped member.

5. The display device according to claim 1, wherein the stand includes, in a first attachment portion or in a second attachment portion of the connecting section thereof, a rotary mechanism rotating the main body section in an up and down direction and a horizontal direction.

6. The display device according to claim 1, wherein
the supporting member includes a rotary mechanism housing section housing a rotary mechanism, and
a second attachment portion of the connecting section attached to the rotary mechanism housed in the rotary mechanism housing section.

7. The display device according to claim 1, wherein
the base member is configured of a transparent board, and
the supporting member has at a front side face thereof a sensor section transmitting or receiving a signal through the base member.

8. The display device according to claim 1, wherein the base member is provided with an indicator indicating an operational state of the main body section.

9. The display device according to claim 1, wherein the base member is configured of a glass plate.

* * * * *